No. 775,951.

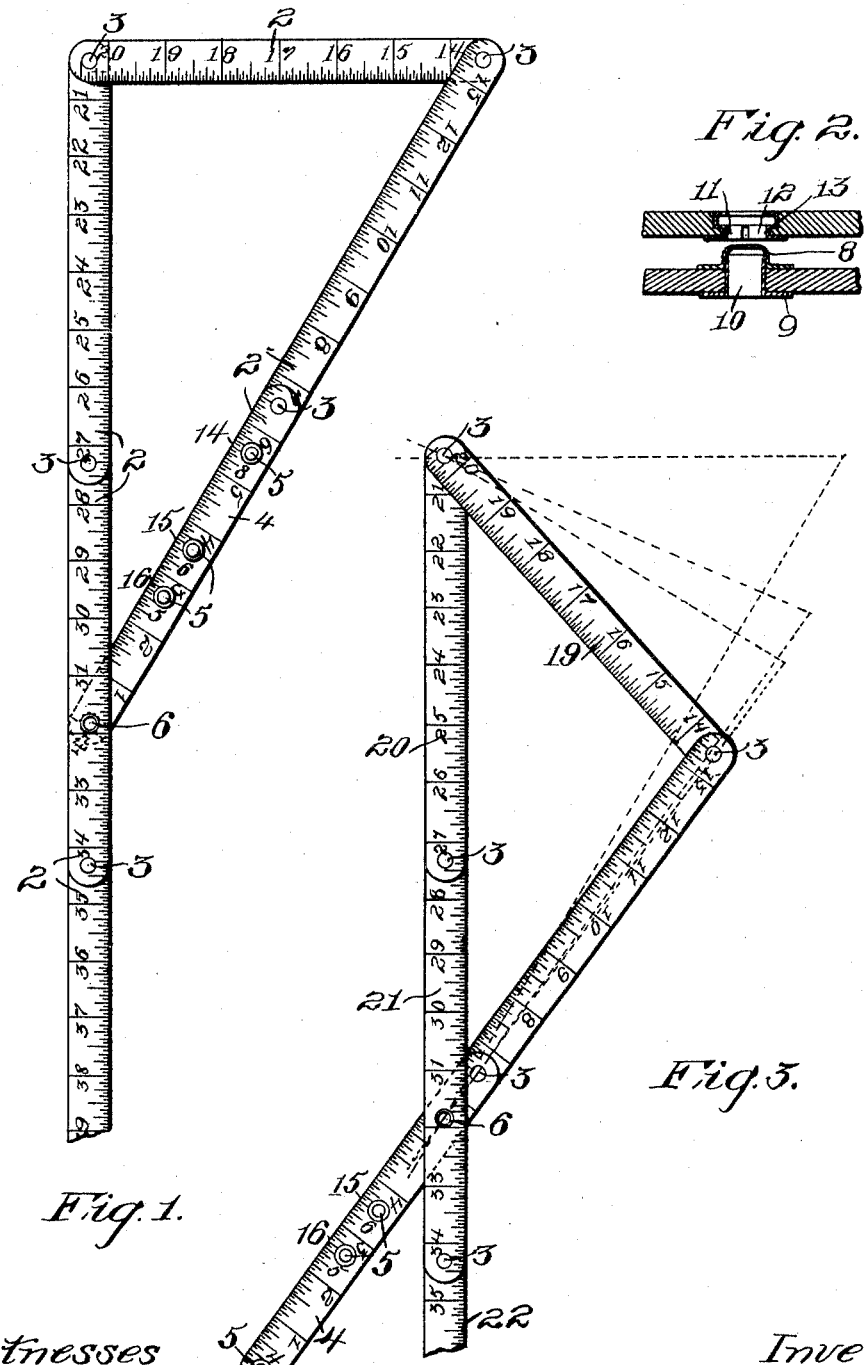

Patented November 29, 1904.

UNITED STATES PATENT OFFICE.

JUSTUS A. TRAUT, OF NEW BRITAIN, CONNECTICUT.

RULE AND ANGLE-FINDER.

SPECIFICATION forming part of Letters Patent No. 775,951, dated November 29, 1904.

Application filed November 14, 1903. Serial No. 131,120. (No model.)

*To all whom it may concern:*

Be it known that I, JUSTUS A. TRAUT, a citizen of the United States, residing in New Britain, in the county of Hartford and State of Connecticut, have invented certain new and useful Improvements in Rules and Angle-Finders, of which the following is a specification.

This invention pertains to instrumentalities for taking measurements and for readily and conveniently determining angles of various degrees. In the present and perhaps the most convenient form the invention may be embodied in a rule or scale of that order which may comprise a plurality of sections which may be so suitably united as to allow each section to swing on another at will, thus to shorten or extend the said rule or scale or else permit certain of said sections to bear various angular relations to certain other sections. In such angular relation of sections to sections it is proposed to afford a temporary locking arrangement, preferably at determined points, and whereby at the same time certain predetermined angles may result. This angle feature of course, it will appear obvious later on, is adapted to many varieties, and thus many results are obtainable.

In the drawings forming a part of this specification, and in which a convenient form of the invention is illustrated, Figure 1 illustrates a section rule or scale provided with the improvements and shows certain sections of the rule locked in certain angular relations to certain other sections, thus giving a certain degree. Fig. 2 illustrates a suitable form of locking mechanism, and Fig. 3 shows other of the many angular relations certain sections may bear to certain other sections, some of such relations being shown diagrammatically.

Similar characters of reference indicate like parts in the figures.

In its present and perhaps preferred form the rule or scale may comprise a plurality of sections or lengths 2, which may be joined one to another at each of their extremities by suitable connections 3. By such a construction, as is obvious, the rule or scale may be shortened, extended, entirely folded, or certain sections may be swung upon other sections to produce certain angular relations of the various sections at will. In the present instance a section, preferably the end section 4, may be provided with locking elements 5, which will coöperate with other locking devices 6, suitably located somewhere in the length of the rule.

In its most convenient form the device for locking the rule in given angular positions may comprise a snap-lock, which may be made in any suitable manner and which in the present instance may comprise a crown or spring-head 8, which may be fastened to the stock of the rule through the instrumentality of an eyelet 10, passing through said stock and having one of its ends flared, as shown at 9 in Fig. 2, to hold said crown in position. As a means for receiving the crown there may be provided an eyelet 11, formed also in said ruled stock and which may comprise a neck 12 and a socket 13, the latter providing a receptacle for the crown 8 when the latter has been snapped into the neck 12, which of course is of smaller dimensions than said crown. In this manner a permanent lock at will may be provided for the rule-sections, so as to keep at will various sections in various angular relations to the other sections, which renders the entire device highly efficient and practical for given purposes.

In the present instance there is shown a socket suitably located in the length of the rule and a plurality of crowns suitably disposed along the end section 4 of the rule. For convenience of illustration these crowns may be disposed at 14, 15, 16, and 18, but are designated on the scale as 4, 5, 6, and 8, and allowing one of the sections—as, for instance, 19—to swivel with relation to the other sections 20 and 21—as seen, for instance, at Fig. 3—the following are among the many angles which may be obtained: For instance, locking the sections by use of the crown at point 4 will give ninety degrees, at point 5 sixty-seven and one-half degrees, at point 6 forty-five degrees, and at point 8 twenty-two and one-half degrees. This will be more clearly shown by reference to Figs. 1 and 3. Of course it is to be understood that such relations of certain sections to others, as is shown in the drawings, is only a few of the great variety of relations which certain sections may bear to other sections. For example, the section 19 may be thrown to the opposite side of sections 20 and 21 and section 22, for instance, and the sections may be at an angle one to another, so as to give a variety of angles that will be obvious.

It is to be understood, of course, that the precise construction and illustration, as has been before mentioned, is simply one embodiment of the present invention, and within the purview of this invention of course it is obvious any construction or arrangement of parts or omission or addition of the same which is calculated to produce a well-defined, efficient, durable, and inexpensive structure involving the principle of this invention may be resorted to.

It will be noted that I have produced a device comprising in the first instance a rule or scale adapted for linear measurement and by the use of which I may obtain various angles and at will retain the various sections of the rule in any given position through the instrumentality of a plurality of locking devices, which also prevents the accidental distortion of the sections relatively to each other, thus obviating the loss of the angle obtained.

Having thus described my invention, I claim—

1. A rule comprising a number of flat sections pivoted together and adapted when folded to pile up flatwise one upon another, a series of spring-headed fasteners carried by and projecting from the outer face of one of the outer sections, and a mating fastener carried by one of the other sections, the positions of the fasteners of said series being such that when respectively locked with the said mating fastener the sections of the rule will form various angles.

2. A rule comprising a number of flat sections pivoted together and adapted when folded to pile up flatwise one upon another, a number of protruding fasteners carried by the outer face of the outer section, and a coöperative locking device upon an inner section and close enough to the face thereof to permit the ready folding of such section upon its neighbors.

JUSTUS A. TRAUT.

Witnesses:
FRED W. BARNACLO,
W. J. WORAM.